3,180,558
PLASTIC VALVE BAG
Dirk Quaadgras, Doorn, and Arend J. van Muylwijk, Treebeek, Netherlands, assignors to Stamicarbon N.V., Heerlen, Netherlands
Filed Feb. 5, 1963, Ser. No. 256,324
Claims priority, application Netherlands, Feb. 7, 1962, 274,510
6 Claims. (Cl. 229—62.5)

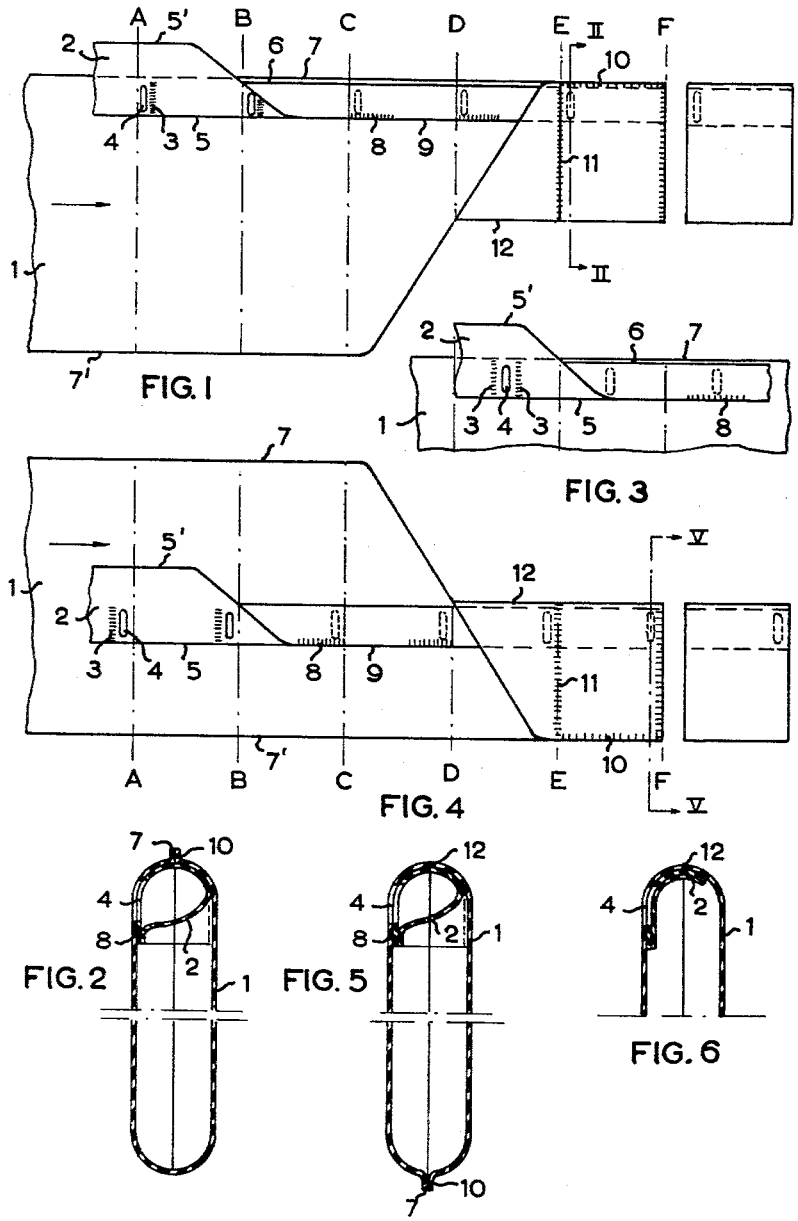

This invention relates to a plastic valve bag and a method of manufacturing the same. More particularly, the bag is of the type having a slot-shaped filling opening provided near its terminal edge and a filling tube associated with this opening and running substantially parallel to the terminal edge of the bag.

Bags of this type are commonly used for packaging powdered or granulated material such as cement, fertilizers, plastic granules, animal feeds, etc. The bags may be made from homopolymer or copolymer polyalkenes, polyvinyl chloride, and the like, or from mixtures thereof. If desired, they may be reinforced with fibrous materials such as rayon, glass fibre, nylon, etc.

By providing a filling opening near the terminal edge of the bag, the package may be filled by conventional filling machines. The filling tube, which is preferably made from a flexible plastic foil, provides the desired closure when the bag has been filled.

In prior constructions the filling tube is welded to the terminal edge of the bag. This prevents bulging of the filling tube from the bag as a result of the pressure exerted by the material in the filled bag, and if the filling tube consists of a folded foil, the tubular shape of the tube is maintained. These desired characteristics are achieved in such constructions by the attachment of the tube and the sealing of the bag at the terminal edge by means of a single welding treatment. However, in practice the bags of these prior constructions are often damaged at the areas where the filling tube is welded to the terminal edge. When the bag is being filled, its filling tube is suspended from the filling spout of the filling machine. The forces exerted on the filling tube and the bag are frequently so high that the welding joint tears. Since the side walls of a filled bag are generally appreciably spaced from one another, a force is generated at the welding joint along the terimnal edge which tends to tear the joint.

Also in bag constructions previously known a change in material thickness occurs at the place where the terminal edge of the filling tube is welded to the bag. It has been founded that in the location where the thickness of the material changes, the joint has a weak spot which is subject to tearing. This results in the filled bag being torn at this weak point when it sustains a shock, as for instance when, after leaving the filling machine, the bag is thrown onto a discharge belt or loaded into a wagon.

The present invention provides a construction which is considerably stronger than those previously known. In such a construction the terminal edge of the bag does not contain a joint of changing thickness, so that the resistance of the bags to shocks is considerably higher than is the case with prior constructions. Moreover, the side of the filling tube which is not welded to the bag in the inventive construction is supported by the terminal edge of the bag when the latter is being filled, so that the forces exerted on the filling tube during the filling of the bag are evenly distributed over the welding joint. These advantages amply compensate for the slight complication caused by a provision for a additional connecting joint for the filling tube.

An additional advantage is that the inventive valve bag lends itself particularly well to continuous manufacture from a strip of plastic foil.

Further objects and the entire scope of the invention will become more fully apparent when considered in light of the following detailed description of illustrative embodiments of this invention and from the appended claims.

The illustrative embodiments may be best understood by reference to the accompanying drawings wherein:

FIGURE 1 diagrammatically illustrates the steps of manufacture of one bag embodiment according to the invention;

FIGURE 2 is an enlarged cross-sectional view, taken along the line II—II, of a bag manufactured by the method illustrated in FIGURE 1;

FIGURE 3 shows a modified construction of the bag manufactured in accordance with the steps illustrated in FIGURE 1;

Figure 7:
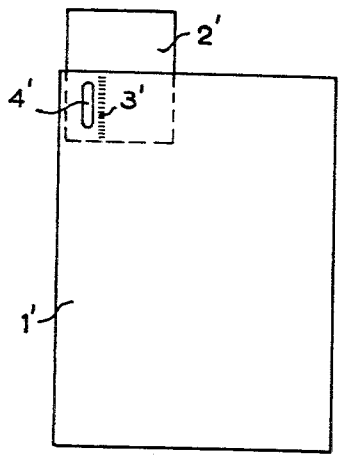
Figure 8:
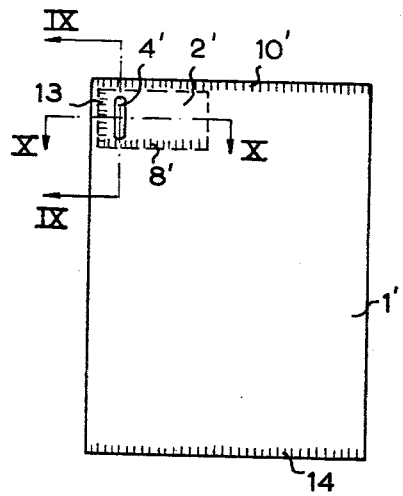
Figure 9:
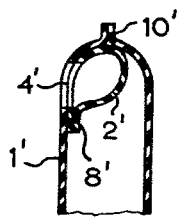
Figure 10:
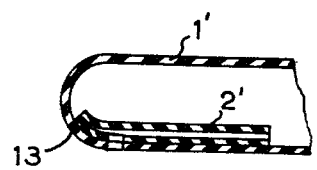
Figure 11:
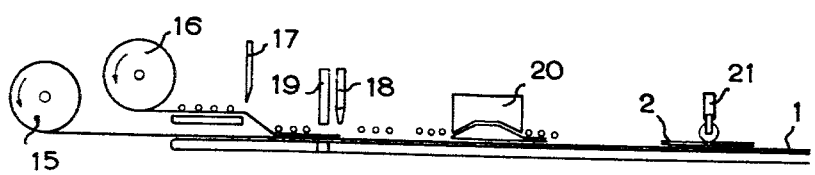

FIGURE 4 diagrammatically illustrates the steps of manufacture of a second bag embodiment;

FIGURE 5 is an enlarged cross-sectional view, taken along the line V—V, of a bag manufactured by the method illustrated in FIGURE 4;

FIGURE 6 is an enlarged cross-sectional view of the bag shown in FIGURE 5 when the bag is filled;

FIGURES 7 and 8 show the mode of manufacture of a bag from tubular material;

FIGURE 9 is an enlarged cross-sectional view of part of the bag taken along the line IX—IX of FIGURE 8;

FIGURE 10 is an enlarged cross-sectional view of a portion of bag taken along the line X—X of FIGURE 8; and FIGURE 11 is a diagrammatical illustration of an integrated process of manufacturing bags from plastic foil.

According to the invention the method of manufacturing the improved valve bag is as follows: On a strip of plastic foil, a narrow plastic strip is placed with its longitudinal axis extending parallel to the longitudinal axis of the first mentioned strip. The narrow strip is fastened to the wider foil by means of one or more welding joints extending from a side edge of the narrow foil to approximately its center. A slot, the length of which is somewhat smaller than that of the welding joint(s), is cut through the two strips adjacent the welding joint, or between the welding joints if a number of joints are provided. The narrow foil is then folded along its longitudinal axis and the edges of this narrow strip are fastened to each other and to the wide foil by means of a welding joint running parallel to the longitudinal axis of the foils and having a length which is less than the width of the bag being manufactured. This joint extends on both sides of the slot. The wide foil is then folded over the narrow foil so that the folding edge of the narrow foil is located against, or at a short distance from, either the folding edge or the terminal edges of the folded parts of the wide foil. The terminal edges of wide strip are then welded together. The walls of the folded wide foil are further connected to each other by means of a welding joint or joints running the full width of these folded sections in a direction perpendicular to the longitudinal axes of the foils. The completed bags are then separated by cutting along these last mentioned joints.

These operations may be carried out automatically by a suitable integrated machine. Bags thus produced are considerably cheaper than bags of the known design since the latter do not lend themselves as well to a fully mechanized production facility.

Referring to the drawings, the manufacture of the plastic bags may be described. In FIGURES 1, 3 and 4 a strip of polyethylene foil 1 having a thickness of, for example, 0.2 mm. is passed through a machine in the direction indicated by the arrow. A narrower strip of polyethylene foil 2 with a thickness of, for instance, 0.1 mm., is placed on strip 1 at A and attached to this strip by means of a welding joint 3, after which a slot 4 is punched through both foils. The welding joint 3 extends from the side edge 5 of the narrow foil to approximately the mid-point of the foil. The length of the slot is somewhat smaller than the length of the welding joint. The slot may be perpendicular to the longitudinal axes of the strips or at an oblique angle thereto, or it may be bent instead of being straight. The welding joint 3 may either be made to the right (FIGURE 1) or to the left of the slot (FIGURE 4). It is also possible to make welding joints 3 on both sides of the slot (FIGURE 3). The latter construction is applied if the slot 4 is located not in a corner of the finished bag but rather closer to the middle thereof.

In the embodiments shown in FIGURES 1 and 2 the narrow foil 2 is so placed on the wide foil 1 that it projects beyond the latter a distance slightly less than half its width. This insures that the following operation, which consists in folding the narrow foil along its longitudinal axis as shown at B, will bring the folding edge 6 slightly below the side edge 7 of the wide foil 1.

In the next operation, the folded edges 5 and 5' of the narrow foil are connected to each other and to the wide foil 1 as shown at C by means of a welding joint 8. This joint extends on both sides of the slot 4 and is generally parallel to the longitudinal axes of the foils, its length being shorter than the width of the bags to be manufactured. As a result, the folded edges 5 and 5' are not connected to each other over part of their length, so that there remains an opening at 9 which is required to fill the finished bags.

The following operation, as shown at D and E, consists of so folding the foil 1 along edge 12 that the terminal edges 7 and 7' coincide. These edges are then connected to each other by means of a welding joint 10. A joint 11, shown at E, perpendicular to the longitudinal axes of the strips, connects the walls of foil 1. The finished bag is then cut along the joint 11 as shown at F to separate the bags. This joint must be sufficiently wide to allow cutting without injury to the bags. It is also possible to make two joints 11 at a shorter distance from one another and to cut off the finished bag between these joints to achieve the same result. The cutting and welding may also be done in one operation.

In a second embodiment of the invention the narrow foil does not project beyond the wide foil. As illustrated in FIGURE 4, the foils 1 and 2 are placed one on top of the other in such a way that the axes of the two foils are at a short distance from each other. The filling tube of the bag, produced by steps B and C as described with reference to FIGURES 1 and 3, is not in contact with a welding joint 10 but lies against the folding edge 12 of the wide foil (see FIGURE 5). By such a construction, the welding joint 10 cannot be damaged when the filling tube of a filling machine is inserted into the bag.

The application of the filling tube as a closure is illustrated in FIGURE 6. When the bag shown in FIGURE 5 is filled with material, the filling tube is collapsed by the material within the bag to press the foil 2 against the slots 4 thereby closing the bag.

The bags according to the invention can, of course, also be made by hand, both from a strip of foil and from tubular plastic film. FIGURES 7 to 10 illustrate the construction of the bag when made from tubular film. Into the tubular film 1' a more narrow foil 2' is inserted. The width of the film 1' is considered as the distance along the tube rather than that along the opening thereof. Thus, the longitudinal axis of the tubular film is normal to the tubular axis. The foil 2' is connected to the film 1' by means of a welding joint 3'. A slot 4' is cut through the wall of film 1' and the foil. The foil is then folded along its longitudinal axis into the bag. The edges of the parts folded into the bag are welded together and to the wall of the tubular film 1' by means of welding joints 8' and 13. Finally, the film is sealed at one open end by means of a welding joint 10'. This joint is spaced from the folding edge of the foil 2' so that this edge is clear of the walls of the bag, but is supported by the terminal edge of the bag when the filling spout of a filling machine is inserted into the bag. At its lower end, the bag is sealed by means of a welding joint 14.

If the bags are manufactured automatically, the narrow foil 2 may also be provided as short strips rather than as a lengthy strip which is only partially sealed to the foil 1. A diagrammatic process for such manufacture is shown in FIGURE 11. The wide foil 1 is supplied from a reel 15, and the narrow foil 2 from a reel 16. Pieces are cut off from the narrow foil by a knife 17 and welded to the wide foil by a sealing device 18. At the same time a slot is made in the two foils by a punch 19. The foil 2 is then folded by the folding device 20 and is sealed to the wide foil by the welding device 21, which provides a longitudinal welding joint.

The plastic valve bags disclosed herein are examples of arrangements in which the inventive features of the disclosure may be utilized, and it will become apparent to one skilled in the art that certain modifications may be made within the spirit of the invention as defined by the appended claims.

What is claimed is:

1. A plastic valve bag comprising: a first strip of plastic, a second strip of plastic foil of a width less than that of said first strip, said second strip being positioned relative to said first strip such that the longitudinal axes of the strips are substantially parallel, said strips being attached at a first joint extending from one side edge of said second strip to approximately the mid-point thereof, a slot extending through said first and second strips adjacent said first joint, a second attaching joint connecting together the said first strip and the side edges of said second strip over a distance less than the width of the bag thereby defining a filling tube, means attaching side edges of said first strip along the length thereof such that the filling tube is located within and is partially enclosed by said first strip, the said second joint and said means attaching side edges of the first strip extending in substantially parallel directions, and means for sealing the first strip to completely enclose the filling tube thereby completing the bag.

2. A plastic valve bag as set forth in claim 1 wherein said second strip is positioned relative to said first strip such that the longitudinal axes of said strips are closely spaced.

3. A plastic valve bag as set forth in claim 1 wherein said second strip is positioned relative to said first strip such that the longitudinal axis of said second strip is immediately adjacent the side edge of said first strip.

4. A plastic valve bag as set forth in claim 2 wherein said first strip comprises a tubular plastic film.

5. A plastic valve bag comprising a bag having two opposed walls joined to one another at the peripheral edges of the walls; and a filling tube positioned wholly within said bag, the filling tube being defined by a generally rectangular strip of plastic foil folded over upon itself substantially along the longitudinal axis thereof, two edges of the foil strip being presented downwardly; means sealing the two last-mentioned strip edges to one another along a substantial portion of their length and means sealing said edges to one of said bag walls; superimposed openings through said last mentioned bag wall and said strip, said filling tube being positioned to extend generally horizontally in the bag near the top of the bag when the bag is in an upright position, the portion of the filling tube adjacent the longitudinal axis of the strip defining the tube lying uppermost in the bag.

6. A plastic valve bag having walls of plastic foil; means defining a filling opening through one bag wall, and means defining a flattenable filling tube disposed within the bag, means defining an opening into said tube, said last-mentioned opening being in registration with said bag wall opening, said flattenable tube being disposed with one of the longtiudinal side edges thereof adjacent and generally parallel to an end of the bag, said tube being secured to said bag wall by means extending along at least a part of the length of the tube adjacent the opposite margin of the tube from its adjacency with the bag end and by means extending generally transversely of said tube adjacent said openings.

References Cited by the Examiner

UNITED STATES PATENTS

| | | | |
|---|---|---|---|
| 810,349 | 1/06 | Rogers | 229—62.5 |
| 2,660,100 | 11/53 | Doyle | 93—35 |
| 2,804,257 | 8/57 | Hasler et al. | 229—62.5 |
| 2,955,517 | 10/60 | Honsel | 93—35 |
| 3,042,287 | 7/62 | Chandler | 229—62.5 |
| 3,087,670 | 4/63 | Rhodes | 229—62.5 |
| 3,102,676 | 9/63 | Danelli et al. | 229—62.5 |

FRANKLIN T. GARRETT, *Primary Examiner.*

EARLE J. DRUMMOND, *Examiner.*